United States Patent
Menheere et al.

(10) Patent No.: US 9,359,952 B2
(45) Date of Patent: Jun. 7, 2016

(54) TURBINE ENGINE HEAT RECUPERATOR PLATE AND PLATE STACK

(75) Inventors: David Harold Menheere, Georgetown (CA); Andreas Eleftheriou, Woodbridge (CA); Daniel T. Alecu, Toronto (CA); Quantai Liu, Mississauga (CA)

(73) Assignee: PRATT & WHITNEY CANADA CORP, Longueuil (CA)

( * ) Notice: Subject to any disclaimer, the term of this patent is extended or adjusted under 35 U.S.C. 154(b) by 1055 days.

(21) Appl. No.: 13/365,711

(22) Filed: Feb. 3, 2012

(65) Prior Publication Data

US 2013/0199152 A1    Aug. 8, 2013

(51) Int. Cl.
| | |
|---|---|
| F02C 7/10 | (2006.01) |
| F28F 3/04 | (2006.01) |
| F28D 9/00 | (2006.01) |
| F28D 21/00 | (2006.01) |

(52) U.S. Cl.
CPC ............... *F02C 7/10* (2013.01); *F28D 9/0068* (2013.01); *F28D 9/0087* (2013.01); *F28D 21/0003* (2013.01); *F28F 3/046* (2013.01); *F05D 2260/37* (2013.01); *F28D 2021/0026* (2013.01); *F28F 2225/04* (2013.01); *Y02T 50/672* (2013.01)

(58) Field of Classification Search
CPC ............... F02C 7/08; F02C 7/10; F02C 1/04; Y02T 50/675; F28D 1/024; F28D 1/05391; F28D 9/0037; F28D 2021/0082; F28D 2021/0026; F28D 9/0012; F28D 9/0018; F28F 13/12; F28F 3/042; F28F 3/044; F28F 3/046
USPC ............ 60/39.511, 266; 165/109.1, 125, 166, 165/176
See application file for complete search history.

(56) References Cited

U.S. PATENT DOCUMENTS

| | | | |
|---|---|---|---|
| 3,590,917 A | | 7/1971 | Huber et al. |
| 3,757,856 A | | 9/1973 | Kun |
| 3,814,171 A | * | 6/1974 | Nakamura ............ F28D 9/0018 165/10 |
| 3,931,854 A | | 1/1976 | Ivakhnenko et al. |
| 4,397,902 A | * | 8/1983 | Resch ............................ 428/119 |
| 4,724,902 A | | 2/1988 | Gross |
| 4,919,200 A | | 4/1990 | Glomski et al. |
| 6,221,463 B1 | * | 4/2001 | White .................. B01D 53/885 165/166 |
| 6,334,985 B1 | * | 1/2002 | Raghuram et al. ............ 422/224 |
| 6,460,614 B1 | | 10/2002 | Hamert et al. |

(Continued)

OTHER PUBLICATIONS

"Stainless Steel Embossed Plate"; Southwest Thermal Technology Inc.; http://stainlessheatexchanger.com/Embossed-Plate.html (date accessed: Nov. 19, 2010).

*Primary Examiner* — Ehud Gartenberg
*Assistant Examiner* — Thomas Burke
(74) *Attorney, Agent, or Firm* — Norton Rose Fulbright Canada LLP

(57) ABSTRACT

A heat recuperator includes a plurality of channel walls composed substantially of thermally-conductive material and supported in spaced-apart relation, defining fluid channels and interstices therebetween. The fluid channels receive at least one primary fluid flow and the interstices receive at least one secondary fluid flow so as to effect heat exchange between the two flows. In use, the plurality of channel walls are deformable by pressure differential between the primary and secondary fluid flows. When at least some of the channel walls are in a deformed state, the plurality of channel walls are stabilized through press fit engagement of mutually opposed contact regions formed in adjacent pairs of the channel walls.

20 Claims, 8 Drawing Sheets

(56) References Cited

U.S. PATENT DOCUMENTS

2002/0073688 A1* 6/2002 Bosley et al. ............. 60/39.511
2006/0185835 A1 8/2006 Matsuzaki et al.
2006/0254758 A1* 11/2006 Matsuzaki et al. ........... 165/166
2007/0144711 A1 6/2007 Rausing
2010/0258285 A1* 10/2010 Yao et al. ..................... 165/167
2015/0099453 A1* 4/2015 Eleftheriou ............... F02C 7/08
454/284

* cited by examiner

TURBINE ENGINE HEAT RECUPERATOR PLATE AND PLATE STACK

TECHNICAL FIELD

The disclosure relates generally to heat recuperators and, more particularly, to heat recuperator plates and plate stacks suitable for use with turbine engines.

BACKGROUND

Heat recuperators (also referred to sometimes as "lamellar" or "stacked" heat recuperators) may be constructed from one or more assemblies of plates or sheets, usually composed of metal or some other thermally conductive material, which are arranged in a stacked formation. Fluids of generally different temperatures may be conducted through passageways that lead in an interleaving fashion between the stacked plates, so that the plates act as barriers to keep separate the respective fluid flows. In the process, heat may be exchanged between the fluid flows across the surfaces of the plates. Optionally, gasket members made from elastic material may be utilized to space adjacent plates in the stack and maintain open passageways for fluid to flow.

Plate heat recuperators will often yield higher thermal efficiencies as compared to other types and configurations of heat recuperators because the fluids in the plate heat recuperators are exposed to a larger surface area as they spread out over the plates. The larger surface area generally facilitates heat transfer and, in at least some cases, will tend to speed up temperature change. Due to their simple construction, plate heat recuperators also tend to be relatively inexpensive to build and maintain in an operable condition through easy assembly and disassembly, such as for cleaning, part replacement, and other minor repair. With their relatively simple construction and high thermal efficiencies, plate heat recuperators may be effectively utilized in a wide array of applications that require high-performance, lightweight heat recuperators such as, for example, in the automotive, aerospace and aeronautical fields, as well as others.

Plate heat recuperators may exhibit limitations. For example, pressure differentials between fluids conducted through heat exchange passageways can exert sometimes considerable stresses on different components of the heat recuperator, such as the gasket members or even the plates themselves. Large enough pressure differentials may even cause these components to fail (the gasket members, if included, usually before the plates), which can thereby constrain use and operation of the plate heat recuperator to specified safe pressure ranges.

SUMMARY

The disclosure relates generally to heat recuperators, such as for use with turbine engines, which may include fluid channels defined by contoured and/or deformable channel walls for exchanging heat between one or more fluid flows.

In at least one broad aspect, embodiments of heat recuperators according to the disclosure provide heat recuperators having a plurality(ies) of channel walls composed substantially of thermally-conductive material and supported in spaced-apart relation to alternately define fluid channel(s) and interstice(s) therebetween. The fluid channel(s) may be configured to receive at least one primary fluid flow and the interstice(s) may be configured to receive at least one secondary fluid flow and to effect heat exchange therebetween. The plurality(ies) of channel walls are deformable by pressure differential between the primary and secondary fluid flow(s). When at least some of the channel wall(s) are in a deformed state, the plurality(ies) of channel walls may be stabilized through press fit engagement of mutually opposed contact region(s) formed in adjacent pair(s) of the channel wall(s).

In at least one other broad aspect, embodiments of heat recuperators according to the disclosure provide gas turbine engines having compressor(s) configured to pressurize an air flow, combustor(s) configured to ignite mixture(s) of fuel and the pressurized air flow so as to develop flow(s) of expanded combustion gases through one or more turbine sections for generating propulsion, and heat recuperator(s) interposed in fluid communication between the compressor(s) and the combustor(s). The heat recuperator(s) have a plurality(ies) of channel walls composed substantially of thermally-conductive material and supported in spaced-apart relation to alternately define fluid channel(s) and interstice(s) therebetween. The fluid channel(s) may be configured to transport the flow(s) of pressurized air from the compressor to the combustor heated during transport by flow(s) of exhaust gases conducted through the interstice(s). The plurality(ies) of channel walls are deformable by pressure differential between the pressurized air flow(s) and the exhaust gase(s). When at least some of the channel wall(s) are in a deformed state, the plurality(ies) of channel walls may be stabilized through press fit engagement of mutually opposed contact region(s) formed in adjacent pair(s) of the channel wall(s).

In at least one other broad aspect, embodiments of heat recuperators according to the disclosure provide heat recuperators having a plurality(ies) of channel walls composed substantially of thermally-conductive material and supported in spaced-apart relation to alternately define fluid channel(s) and interstice(s) therebetween. The fluid channel(s) may be configured to receive at least one primary fluid flow and the interstice(s) may be configured to receive at least one secondary fluid flow and to effect heat exchange therebetween. At least some of the plurality of channel wall(s) may be contoured by a plurality(ies) of hyperbolic surface(s) extending between adjacent protrusion(s) and/or recess(es) formed in the channel wall(s).

In some embodiments, optionally, at least one channel wall in a heat recuperator according to the disclosure may be contoured according to a three-dimensional contour profile of alternating protrusions and/or recesses.

In some embodiments, optionally, at least some protrusions according to the three-dimensional contour profile may include a central dome portion, a plurality of planar side surfaces arranged peripherally around and extending distally from the central dome portion, and a plurality of hyperbolic side surfaces, such that each hyperbolic side surface may be bounded by the dome portion and a corresponding adjacent pair of the planar side surfaces.

In such embodiments, optionally, the hyperbolic side surfaces from two diagonally adjacent protrusions and two diagonally adjacent recesses may form a hyperbolic paraboloid, and/or each of the plurality of planar side surfaces may include a stripline section.

In such embodiments, optionally, the central dome portion may also include a flat apex portion that provides a region on that channel wall for making contact with an adjacent channel wall within the heat recuperator, if/when one or more adjacent channel walls are in a deformed state.

Further details of these and other aspects of the described embodiments will be apparent from the detailed description below.

BRIEF DESCRIPTION OF THE DRAWINGS

Reference is now made to the accompanying drawings, in which.

DETAILED DESCRIPTION OF THE PREFERRED EMBODIMENTS

Various embodiments of various aspects of the disclosure, including at least one preferred embodiment of each, are described below with reference to the drawings.

Figure 1:
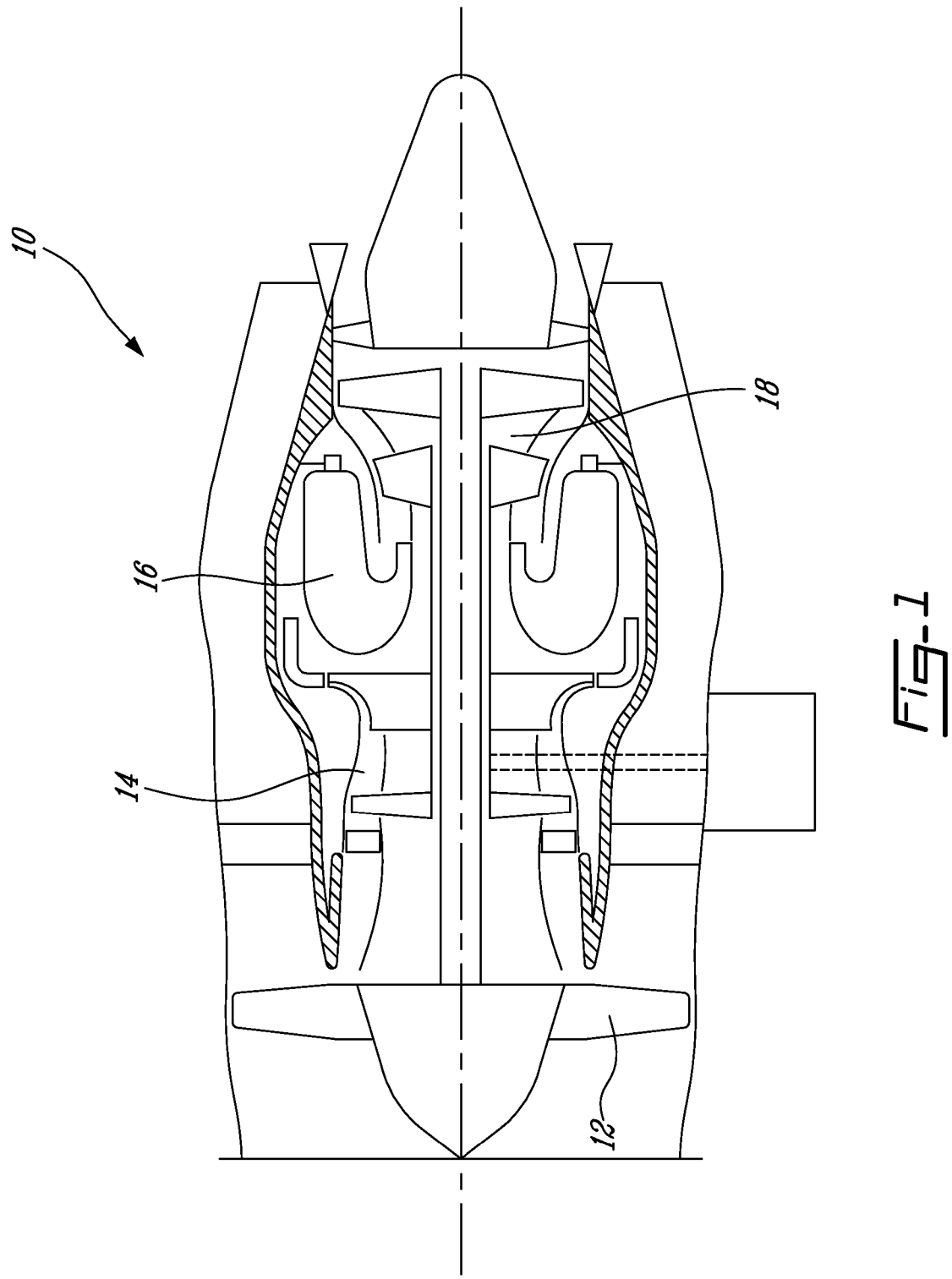
FIG. 1 shows an axial cross-sectional view of a turbo-fan gas turbine engine.

Reference is initially made to FIG. 1, which illustrates a gas turbine engine 10 of a type preferably provided for use in subsonic flight, generally comprising in serial flow communication a fan 12 through which ambient air may be propelled, a multistage compressor 14 for pressurizing the air, one or more combustors 16 in which compressed air may be mixed with fuel and ignited for generating a flow of expanded combustion gases, and one or more turbine sections 18 for extracting energy from the combustion gases.

Figure 2:
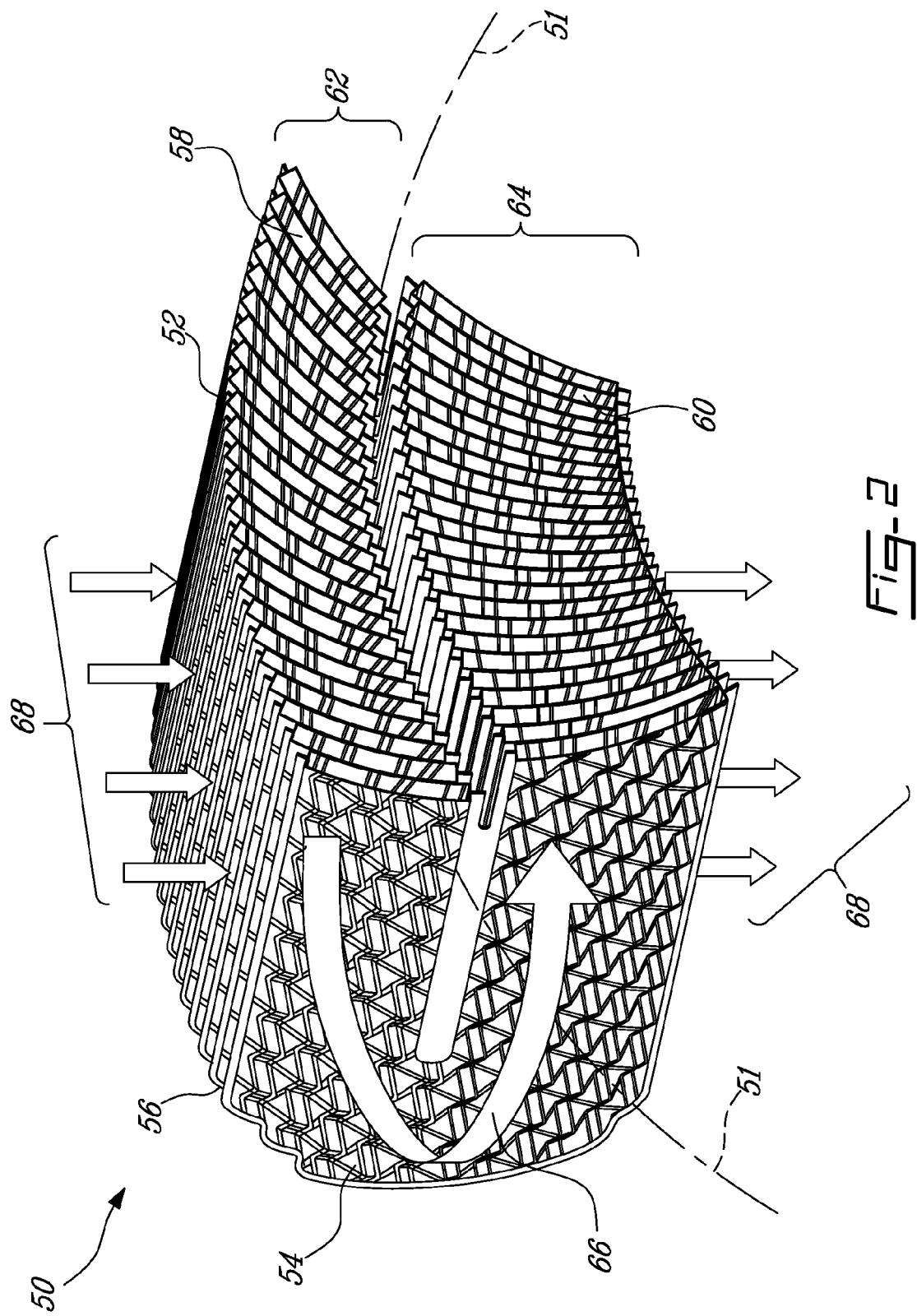
FIG. 2 shows a perspective view of a stacked plate heat recuperator.

Referring now to FIG. 2, there is generally shown a heat recuperator 50 having a stacked plate configuration that may be suitable for one or more different uses or applications, such as within or otherwise in conjunction with a gas turbine engine 10 shown in FIG. 1. However, the heat recuperator 50 is not necessarily limited to use only in or with such gas turbine engines, and may be suitable for other uses or applications, either with or without alteration or modification thereof, to suit the particular use or application.

The heat recuperator 50 is shown having a stacked plate configuration in which a stack 52 is formed out of a number of the fluid channels 54 mounted in general alignment with each other along on an axis 51 of the stack 52. To provide structural stability, a stack 52 may be mounted on one or more backing members, such as a frame, chassis or endplate (not shown), which does not impede the flow of fluid through the heat recuperator 50, as explained below.

To facilitate stacking, some or all of fluid channels 54 may have somewhat planar or flattened profiles, and may be oriented so that the axis 51 of the stack 52 is generally horizontal (as shown in FIG. 2). Alternatively, the fluid channels 54 may be oriented so that the stack 52 has a generally vertical axis, or an axis in any other desired orientation (not shown). As will be appreciated, references to directions or orientations, such as "horizontal" and "vertical", which are made in the context of the stack 52 or any other component of the heat recuperator 50 may be relative only and are not intended to specify or connote direction or orientation in an absolute or geographical sense. As used herein through, the "axis" of the stack 52 may indicate the general direction or vector 51 in which the fluid channels 52 are stacked and may be oriented generally orthogonal to the fluid channels 54.

Fluid channels 54 may be stacked in relatively close proximity to one another, so that a number (i.e., one or more) of interstitial layers (more generally "interstices") 56 are formed between the individual fluid channels 54 in the stack 52. In some embodiments, interstices 56 may be interleaved between fluid channels 54, such that one or more individual interstices 56 are sandwiched between adjacent pairs of fluid channels 54. The particular shape(s) of interstices 56 may be defined by the shape(s) and spacing(s) of fluid channels 54 and, in some embodiments, as for example where fluid channels 54 have a generally planar shape, may resemble interstitial layers or any other generally planar shape.

In some embodiments, first fluid passageways may be provided through the fluid channels 54 and second fluid passageways, separate from the first fluid passageways, may be defined through the interstices 56 between the fluid channels. Accordingly, the first fluid passageways may be suitable to receive first flow(s) of fluid and the second fluid passageways may be suitable to receive second flow(s) of fluid. To provide the first and second passageways, each of the fluid channels 54 may be constructed generally from a plate assembly that includes at least a pair of thermally-conductive plates or sheets in sealed together relation. Collectively, each such plate assembly defines a corresponding interior passageway between individual plates or sheets in the assembly (i.e., fluid channel 54) and, in conjunction with an adjacent plate assembly, a corresponding exterior passageway between adjacent plate assemblies (i.e., interstice 56). Such configuration is explained in more detail below with reference to FIGS. 3 and 4A-4B.

In various embodiments, a stack 52 may have some axial curvature (for example, which is discernible in FIG. 2) by shaping and/or angling of the fluid channels 54 relative to one another so as to introduce some deviation or curvature to the axis 51. For example, the stack 52 may be shaped so to facilitate coupling with, passage by, or other compatibility with one or more external components, such as compressor bleed valves, to provide more compact housing within one or more additional components, improve aerodynamic properties, and/or for any other reason(s) generally. In other embodiments (not shown), a stack 52 may have a linear axial profile if/as required or convenient.

Each fluid channel 54 may be formed with one or more fluid intake ports 58 (shown also in FIGS. 3 and 4A-4B) located at one end of the fluid channel 54, and one or more fluid exhaust ports 60 (shown also in FIG. 3) located at another end of the fluid channel 54. One or more of the fluid intake ports 58 may be located on fluid channels 54 in common relative location(s) so that, collectively, fluid intake ports 58 from the fluid channels 54 may form or otherwise accommodate one or more fluid intake manifolds 62 for the heat recuperator assembly 50. Similarly one or more fluid exhaust ports 60 may be located on fluid channels 54 in common location(s) so that, collectively, the fluid exhaust ports form or otherwise accommodate one or more fluid exhaust manifolds 64 for the heat recuperator assembly 50. The fluid intake manifold(s) 62 and fluid exhaust manifold(s) 64 may be used, for example, to provide and/or extract fluid flow(s) to any or all of the fluid channels 54 simultaneously in parallel.

Fluid channels 54 collectively may provide one or more fluid passageways that are sealed from the external environment (other than at fluid intake port(s) 58 and fluid exhaust port(s) 60), including being sealed from interstices 56. Primary fluid flow(s) (represented by arrow 66) may be conducted through any or all of fluid channels 54 of a heat recuperator 50. Being sealed off from the fluid channels 54, the interstices 56 also collectively define fluid passageway(s) through the heat recuperator 50 in which secondary fluid flow(s) (represented by arrows 68) may be conducted through the heat recuperator 50 without admixture or intermingle- ment with primary fluid flow(s) 66 being conducted through the fluid channels 54.

For example, a fluid intake manifold 62 may be sealingly or otherwise connected to a primary fluid source to receive a supply of a primary fluid into the heat recuperator 50. To facilitate reception of a primary fluid into the fluid intake manifold 62, each of the fluid intake ports 58 may be fitted with outwardly angled lips that increase the surface profile of the fluid intake manifold 62. Fluid outtake manifold 64 may be sealingly or otherwise connected to a fluid drain, circula- tion system, or other reservoir into which the primary fluid may be expelled after conduction through the fluid channels 54.

Sealed environment(s) for secondary fluid flow(s) 68 through interstices 56 without leakage may be provided by fitting stack(s) 52 of fluid channels 54 into housings or other bodies (not shown) sealed off from environments external to the heat recuperator(s) 50. Alternatively, interstices 56 may be open to and fluidly coupled with such external environ- ments by omission of the housing or other body, in which case the secondary fluid flow through the interstices 56 may be developed using environmental fluids such as air using, for example, naturally occurring forces such as osmosis, thermal and/or atmospheric currents or convections, pressure differ- ential, and the like.

To facilitate heat exchange between primary fluid flow(s) 66 and secondary fluid flow(s) 68 within a heat recuperator 50, fluid channel(s) 54 may be formed using any suitable thermally conductive material(s), including for example met- al(s) and/or various carbon composite materials, alone or in any combination(s), mixture(s), or concentration(s) which may be suitable for providing heat exchange. For lightweight design and improved thermal efficiency, fluid channels 54 may also be constructed to have minimally thick channel walls. Those skilled in the relevant arts, having been made familiar with this disclosure, will not be troubled to identify and configure materials having suitable qualities, including appropriate strength, stability, and/or heat transfer character- istics.

Any substance(s) in any state(s) of matter, natural or oth- erwise, which are capable of forming into a continuous or any other fluid flow may be conducted through fluid channels 54 and/or interstices 56, without limitation, including gases, liq- uids (pure or solution), and plasmas, as well as mixtures or combinations of different states of matter. As used herein throughout, terms such as "fluid", "fluid flow", and the like are intended to encompass flows of any such capable sub- stance that have the ability to expand into or take on the shape of their container. However, as described in more detail below, the fluid channels 54 and interstices 56 may be par- ticularly well suited to exchanging heat between two isolated, but thermodynamically interactive, flows of different pres- sure gases.

Optionally, in some embodiments, shaping of fluid chan- nels 54 to have 180-degree or other degrees of curvature along portion(s) of fluid channel(s) 54 located between fluid intake port(s) 58 and fluid exhaust port(s) 60, may enable one or more fluid intake manifolds 62 and/or fluid exhaust manifolds 64 to be located on common side facets of stack(s) 52. Among other advantages, such shaping may provide for compact stacking of the fluid channels 54 within a heat recuperator 50, while also maximizing surface area between fluid channels 54 and interstices 56 for increased thermal efficiency of the heat recuperator 50.

In use, primary fluid flow(s) 66 of a primary fluid may be drawn, forced, conducted, or otherwise received into a heat recuperator 50 through a fluid intake manifold 62 and, sub- sequently, may progress through fluid channels 54 such that the primary fluid is discharged from the heat recuperator 50 through a fluid exhaust manifold 64. As the primary fluid passes through fluid channel(s) 54 secondary fluid flow(s) 68 of a secondary fluid may be drawn, forced, conducted, or otherwise received into interstices 56 between the fluid chan- nels 54 such that the secondary flow passes in thermal con- ductive proximity along the walls of fluid channel(s) 54 in, for example, a generally transverse direction to the primary fluid flow being conducted through the fluid channels 54. When the primary and secondary fluid flows 66 and 68 are provided with generally different temperatures upon entry into the heat recuperator 50, the two fluid flows 66 and 68 may effect heat exchange across the walls of the fluid channels 54 as each flow progresses through the heat recuperator 50, thereby bringing the two fluid flows 66 and 68 closer in temperature than upon entry to the heat recuperator 50. Thus, the hotter of the two fluid flows 66 and 68 may be cooled and the cooler of the two fluid flows 66 and 68 may be heated.

In some embodiments, fluid channels 54 may be used to conduct relatively high-pressure, low-temperature fluids as compared to relatively low-pressure, high-temperature fluids conducted through interstices 56. For example, a low-pres- sure, high-temperature fluid conducted through the inter- stices 56 may include exhaust gases from a gas turbine engine, such as the gas turbine 10 shown in FIG. 1. In such cases, the high-pressure, low-temperature fluid conducted through the fluid channels 54 may be pressurized air (e.g., output from the compressor 14 of engine 10) directed to the heat recuperator 50 for heating by the engine exhaust gases in fluid channels 54 in preparation for injection into a combustor 16.

While it may be advantageous in some embodiments for one or more fluid channels 54 to conduct a relatively high- pressure, low-temperature fluid in comparison to a fluid con- ducted through the interstices 56, the heat recuperator 50 is not limited to such usage and, with suitable modification or alteration, if/where appropriate, other uses may be made. As a particular non-limiting example, fluid channels 54 may be used to conduct a relatively high-temperature fluid in com- parison to the interstices 56. Fluid channels 54 may also be used to conduct a relatively low-pressure fluid as compared to the interstices 56, although the shape of the fluid channels 54 (described in greater detail below with reference to FIGS. 8A and 8B) may be particularly well suited for conduction of a relatively high-pressure fluid therethrough.

Figure 3:
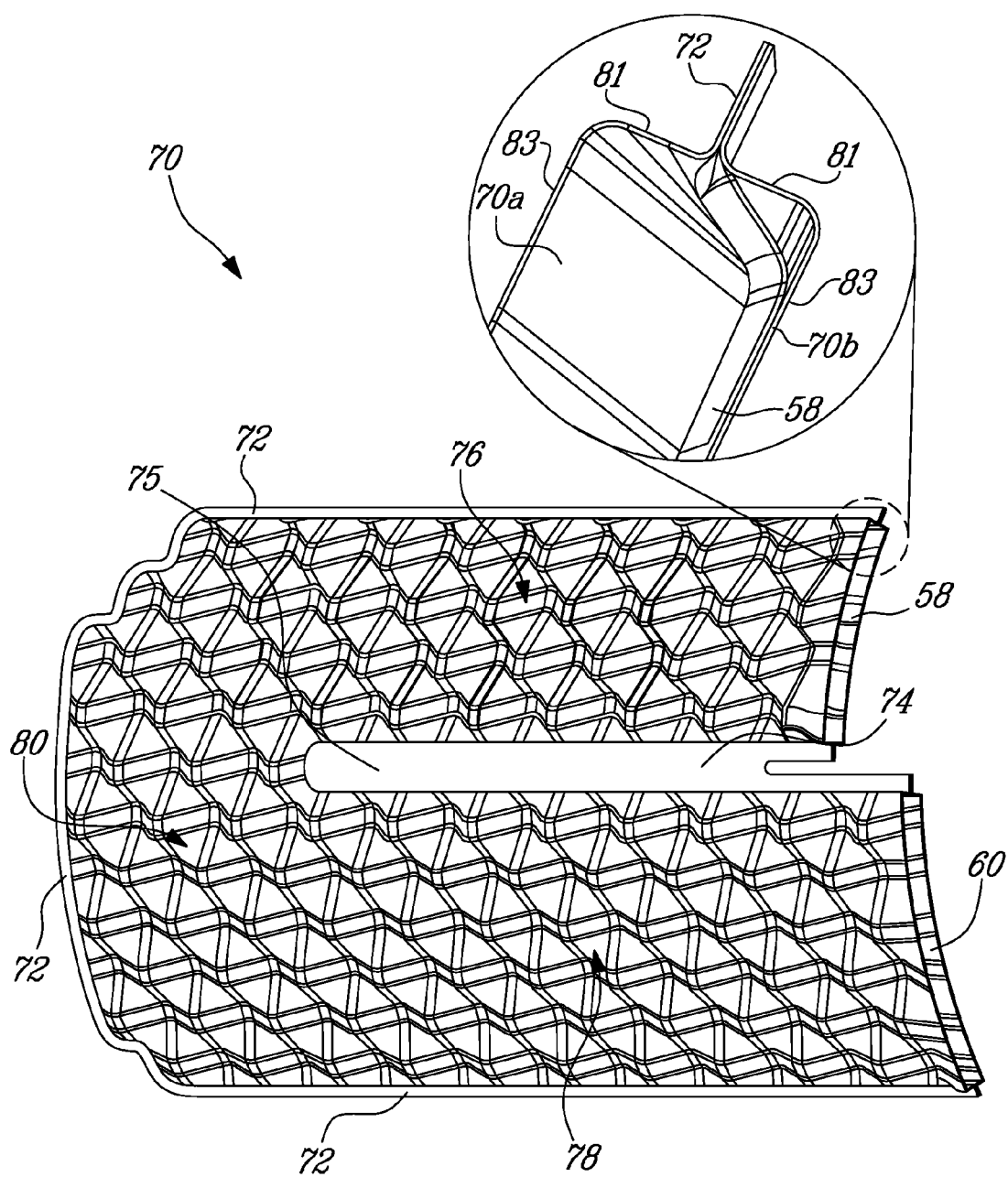
FIG. 3 shows a side perspective view of an individual plate assembly of the stacked plate heat recuperator of FIG. 2, including a close up of a fluid intake port of the plate assembly.

Referring to FIG. 3, one or more of fluid channels 54 may be implemented in the form of a plate assembly 70 con- structed using two plates 70a and 70b, which may be shaped and contoured in a manner such as that shown in FIG. 3, and fastened together. To form a sealed passageway through the interior of the plate assembly 70 for fluid to flow, plates 70a and 70b may be fitted to one another along one or more peripheral edge(s) 72 extending from a fluid intake port 58 toward a fluid exhaust port 60 around the periphery of each of the plates 70a and 70b. Plates 70a and 70b may also be sealingly fitted together along a medial strip 74 running par- tially lengthwise along each of the plates 70a and 70b, between an inflow portion 76 and an outflow portion 78, and terminating at a distal end 75 located adjacent to bend portion 80.

In the embodiment shown in FIG. 3, inflow portion 76 of the plate assembly 70 extends laterally between peripheral edge 72 and medial strip 74 interior of fluid intake port 58 and is contiguous with the bend portion 80. Similarly, outflow portion 78 of the plate assembly 70 extends laterally between peripheral edge 72 and medial strip 74 interior of fluid exhaust port 60 and is contiguous with the bend portion 80. Past distal end 75 of medial strip 74, around which bend portion 80 rounds, the bend portion 80 is bounded by a portion of the peripheral edge 72. As explained further below, any or all of inflow portion 76, outflow portion 78, and bend portion 80 may be formed with three-dimensional contour (or surface) profile(s), which, in various embodiments, may repeat according to a two-dimensional lattice pattern.

As may be seen in the close-up of fluid intake port 58 provided in FIG. 3, lateral sidewalls 81 may be formed in either or both of plates 70a and 70b by means of elbows formed or otherwise located adjacent to peripheral edge 72. Lateral sidewalls 81 may also be formed in the plates 70a and 70b by elbows located adjacent to the medial strip 74. Channel walls 83 may be formed in plates 70a and 70b, and may be spaced apart by sets of lateral sidewalls 81 upon which channel walls 83 are supported. Accordingly, in some embodiments, plates 70a and 70b may not be in physical contact other than at the peripheral edge 72 and medial strip 74 (where the plates 70a and 70b may be sealed together to define the fluid-tight passageway therethrough for fluid to flow) and, in particular, may not make physical contact at any or all of inflow portion 76, outflow portion 78, and bend portion 80 of plate assembly 70.

In some embodiments, either or both of plates 70a and 70b may be formed of sheets, plates or other forms of suitably thin or otherwise formable metal or other thermal conductor(s) that may be bent, machined, curled, drawn, cut, deformed, tooled, pressed, or otherwise shaped into three-dimensional contour profile(s) such as those shown in FIG. 3. Those skilled in the relevant arts, having been made familiar with this disclosure, will not be troubled to identify suitable processes or techniques for shaping of the plates 70a and 70b.

Figure 4A:
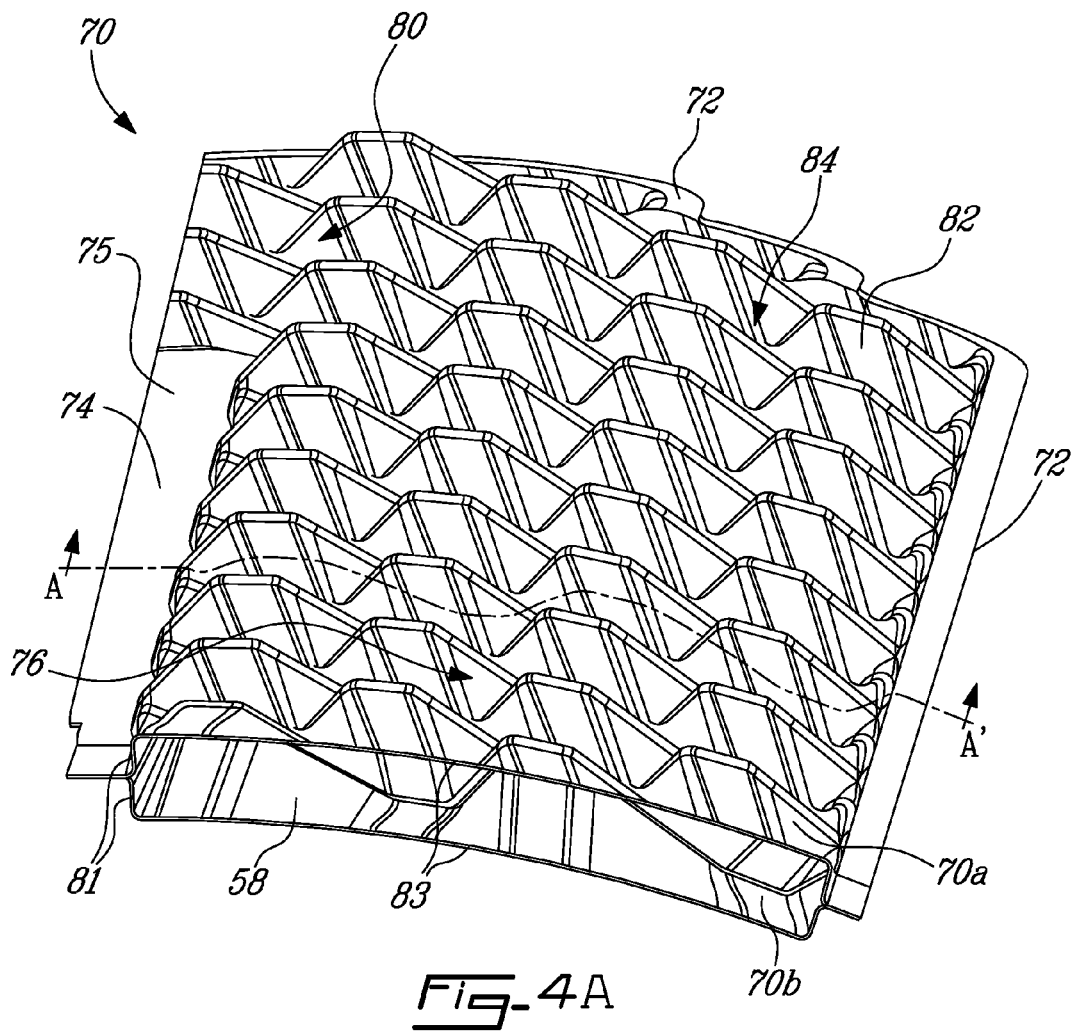
FIGS. 4A and 4B show partial end perspective and cross-sectional views of the plate assembly of FIG. 3.
Figure 4B:
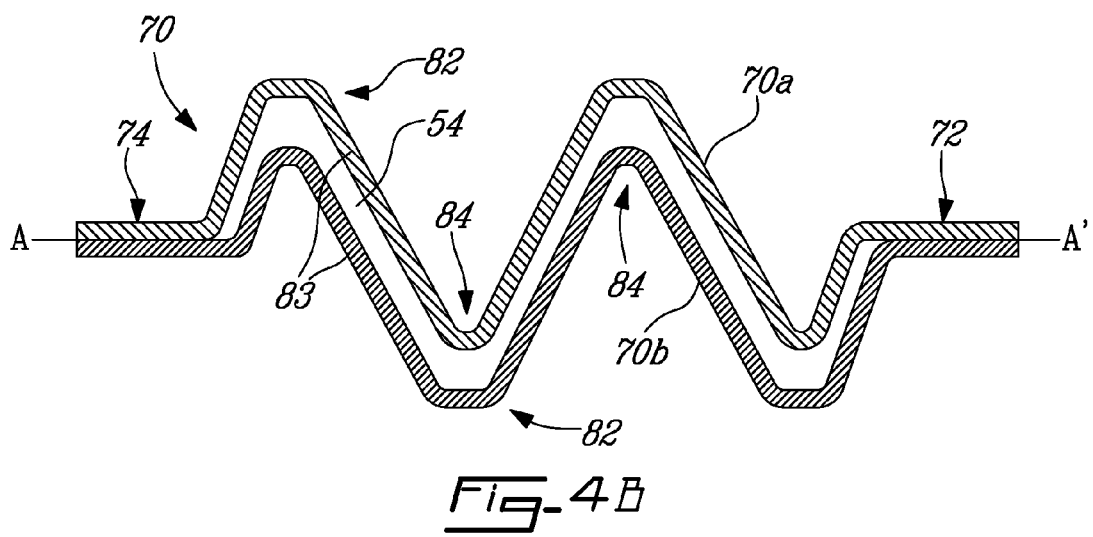

As shown in FIGS. 4A and 4B, surface(s) of either or both of plates 70a and 70b may be corrugated or otherwise contoured so as to include a number of protrusions 82 and recesses 84 (shown in end perspective view in FIG. 4A and cross-sectional profile in FIG. 4B). Maximizing surface area(s) of plate(s) 70a, 70b and other components of recuperator(s) 50 through the employment of contouring, such as protrusions 82 and recesses 84, may be effective so as to increase or otherwise optimize heat exchange between fluids flowing adjacent to these surfaces. A wide variety of patterns and/or variations of surface contours that are consistent with the purposes disclosed herein may be employed for the purpose. For example, as described in more detail below, one or more classes of surface contours in which protrusions 82 and recesses 84 are defined by interspersed planar and hyperbolic sheets may be effectively utilized.

Relative to a fluid channel 54 formed between the plates 70a and 70b, protrusions 82 may extend in one direction away from an imaginary mid-plane defined by peripheral edge 72 and medial strip 74, approximately midway between the top(s) of protrusions 82 and base(s) of recesses 84. Similarly, recesses 84 may extend from such imaginary mid-plane(s) in an opposite direction to the protrusions 82. (From the perspective of the fluid channel 54, the protrusions 82 may point "away" from, while the recesses 84 may point "toward", the fluid channel 54.)

Surface contours of two or more adjacent plates 70a and 70b may be matched so as to permit nesting or otherwise wholly or partially conformal fitting of the plates 70a and 70b, whereby some or all of protrusions 82 on a given one of the plates 70a and 70b may oppose and be sized so as to accommodate corresponding recesses 84 of any adjacent plates 70a and 70b. Thus, some or all of protrusions 82 on a plate 70a may accommodate a corresponding recess 84 from the plate 70b, and vice versa. Resulting fluid channel(s) 54 between such plates 70a and 70b may correspondingly have cross-sectional profiles (for example, taken along the line A-A' shown in FIGS. 4A and 4B) that may "zig-zag" or undulate up and down from protrusion 82 to adjacent recess 84. Undulations in the cross-sectional profiles of the fluid channel(s) 54 may extend widthwise, lengthwise or in any direction.

An undulating flow path formed by protrusions 82 and 84 may be effective so as to increase fluid turbulence, and therefore fluid mixing, within the fluid channels 54 to thereby promote heat exchange between the primary and second fluid flows. In contrast to some other configurations of heat recuperators, because the protrusions 82 and 84 are "nested" together or otherwise partially or wholly conformed to one another, internal support structures within the plate assemblies 70 and used to space apart the respective plates 70a and 70b (e.g., gaskets) may be omitted, which advantageously tends to decrease flow resistance through to the plate assemblies 70 and may also improve other performance characteristics of the heat recuperator 50, such as operating temperature and/or pressure ranges. In the absence of internal support structures within the plate assemblies 70, as explained in more detail below, the individual plate assemblies 70 may cooperate with each other during operation of the heat recuperator 50 to provide a self-stiffening or self-stabilizing action that adds lateral stability to the stack 52 in the direction of the axis 51 (shown in FIG. 1). The individual plate assemblies 70 may thereby accommodate thermal expansion with reduced or minimized stresses when undergoing mechanical deformation caused, for example, by pressure differentials either side of the individual plate assemblies 70.

Figure 5A:
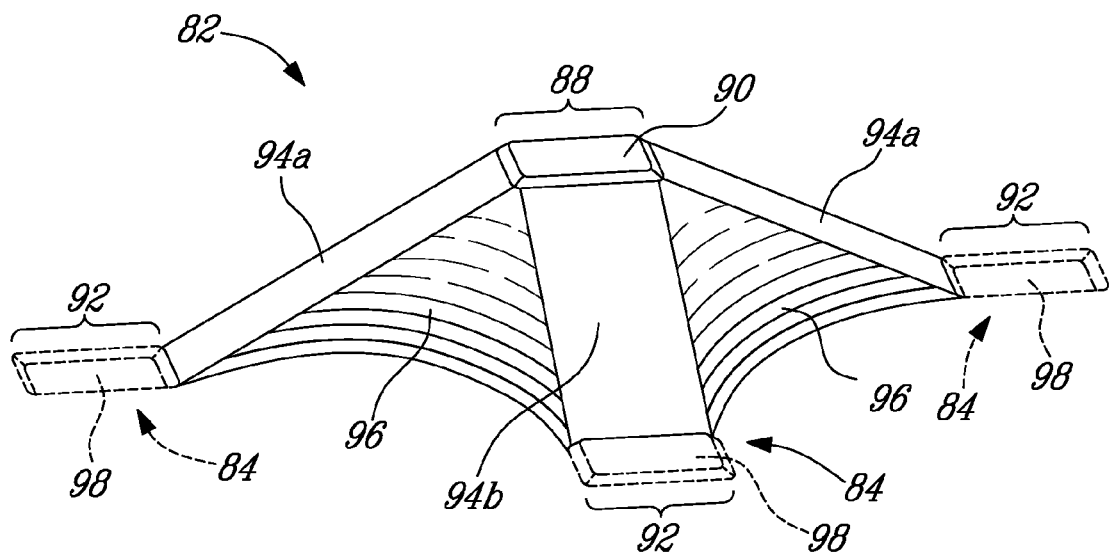
FIGS. 5A and 5B show schematic representations of a protrusion and a hyperbolic sheet used to surface contour the plate assembly of FIG. 3.
Figure 5B:
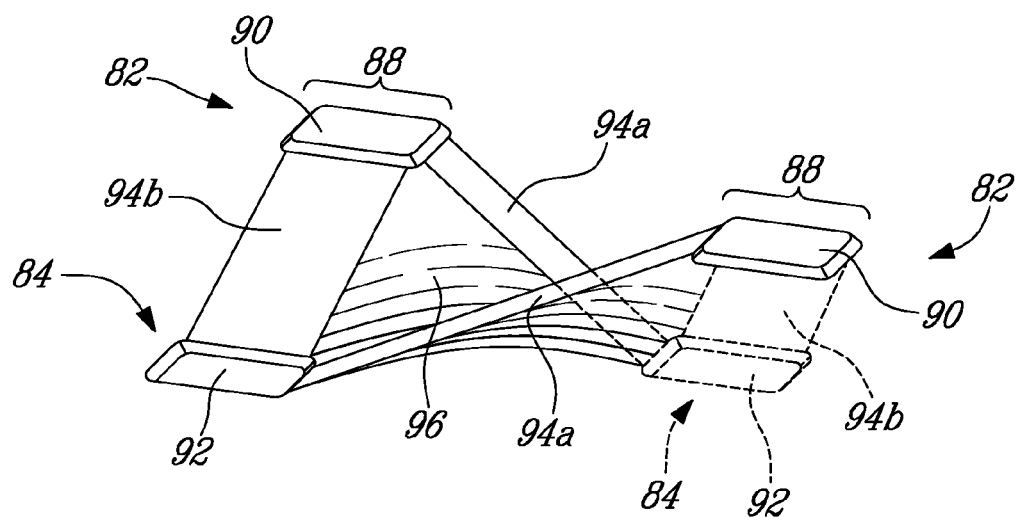

Referring to FIGS. 5A and 5B, embodiments of protrusions 82 and recesses 84 are described in more detail. By way of illustration, FIG. 5A depicts a protrusion 82 neighbored on four sides by corresponding recesses 84 (depicted partially), while FIG. 5B depicts a quadrant formed by two diagonally adjacent protrusions 82 (depicted partially) and two diagonally adjacent recesses 84 (depicted partially). As explained further below, the shapes depicted in FIGS. 5A and 5B may each equivalently provide the basic unit of a repeating lattice pattern formed in the plates 70a and 70b.

As shown in FIG. 5A, a protrusion 82 may be formed in plate(s) 70a, 70b to include one or more domes 88 that is(are) rounded off into a flat apex 90 at an extreme height of the protrusion 82. The dome 88 is supported on a number of contoured side walls of the protrusion 82 that lead, depending on the direction, either toward the dome 88 of an adjacent protrusion 82 or, alternatively, toward the foot 92 of an adjacent recess 84. Optionally, a flat base 98 may be located at the extreme depth of the recess 84. Protrusions 82 and recesses 84 may not necessarily have discretely or clearly delimited boundaries and may, in various embodiments, extend contiguously into one another by way of contoured sidewalls or other three-dimensional surfaces.

In some embodiments, the dome 88 may be supported on pairs of opposing side planar surfaces 94a and 94b, each such surface extending distally from the dome 88 toward a corresponding foot 92 of a recess 84 that neighbors the protrusion 82. Side planar surfaces 94a and 94b may be rectangular sheets or striplines having a substantially flat or planar surface profile oriented with some degree of pitch. Side planar surfaces 94a and 94b may be of different widths (as shown in FIGS. 5A and 5B) to provide protrusions 82, and thereby also the recesses 84, with a flattened or oblong shape. Alternatively, the side planar surfaces 94a and 94b may have equal or nearly equal widths (not shown) to provide the protrusions 82 and the recesses 84 with a more squared shape.

Interleaved between side planar surfaces 94a and 94b may be provided a number of hyperbolic surfaces 96, each extending distally from the dome 88 and bounded on one or more sides by one of the planar side surfaces 94a and 94b. As shown in FIG. 5B, in some embodiments, hyperbolic surfaces 96 may dip between the domes 88 of two diagonally adjacent protrusions 82, while cresting between the feet 92 of two diagonally adjacent recesses 44 in a quadrant formed of the two pairs of diagonally adjacent protrusions 82 and recesses 84, to thereby trace out a hyperbolic paraboloid (also referred to sometimes as a "saddle surface").

In various embodiments, formation of protrusions 82 (equivalently the recesses 84) in plates 70a and 70b, may not require stretching of material from which the plate(s) 70a and 70b are fabricated. For example, starting from a flat sheet (e.g., of metal), side planar surfaces 94a and 94b may be formed by bending or kinking the sheet at the boundary edges between corresponding side planar surfaces 94a and/or 94b and an adjacent dome 90 and/or foot 92 to provide the side planar surfaces 94a and 94b with pitch. Hyperbolic surface(s) 96 may then be formed using shear forces in the plane of the sheet to provide contouring as illustrated in FIGS. 5A and 5B. Thus, deformation of a plane square without significant stretching in any direction or along any axes may realize the hyperbolic surfaces 96.

As compared to other possible three-dimensional contours, hyperbolic surfaces 96 may advantageously provide protrusions 82 (and recesses 84) with increased structural stability. For example, as mentioned, hyperbolic surfaces 96, as well as planar side surfaces 94a and 94b, may be formed without significant material stretching that could introduce residual mechanical stresses, strains or other sources of weakness into the plate assemblies 70. Elimination of such material stretching may therefore add to the robustness and material strength of the hyperbolic surfaces 96 in response to applied force.

Moreover, relative to pyramids, frusto-conical sections, hemispherical domes, and other purely convex geometries, hyperbolic surfaces 96 may combine concavity in one direction and convexity in an orthogonal direction. When loaded under pressure(s), such hyperbolic surfaces 96 can experience compression in one direction, but tension in the other direction, which tend to balance out and negate each other, thereby making the whole structure of the protrusion 82 more tolerant to deflections that ultimately might lead to buckling of the plate(s) 70a and 70b. This can allow the plates 70a and 70b to be operated in larger pressure ranges for a given material thickness. Alternatively, for operation in a given pressure range, thinner materials that are lighter and consequently less costly may be utilized to fabricate the plates 70a and 70b. Reduced deflection also maintains the fluid channel(s) 54 between the plates 70a and 70b open for fluid to flow without obstruction.

In some embodiments, protrusions 82 and recesses 84 may be substantially symmetrical about a mid-plane defined therebetween, i.e., a protrusion 82 can extend from a mid-plane by approximately the same height or distance as a corresponding recess 84 extends from the mid-plane in the opposite direction. Alternatively, protrusions 82 and recesses 84 may be asymmetrical in the sense that the dome 88 extends a further height (distance) away from the imaginary mid-plane than does the foot 92 in an opposite direction.

Figure 6:
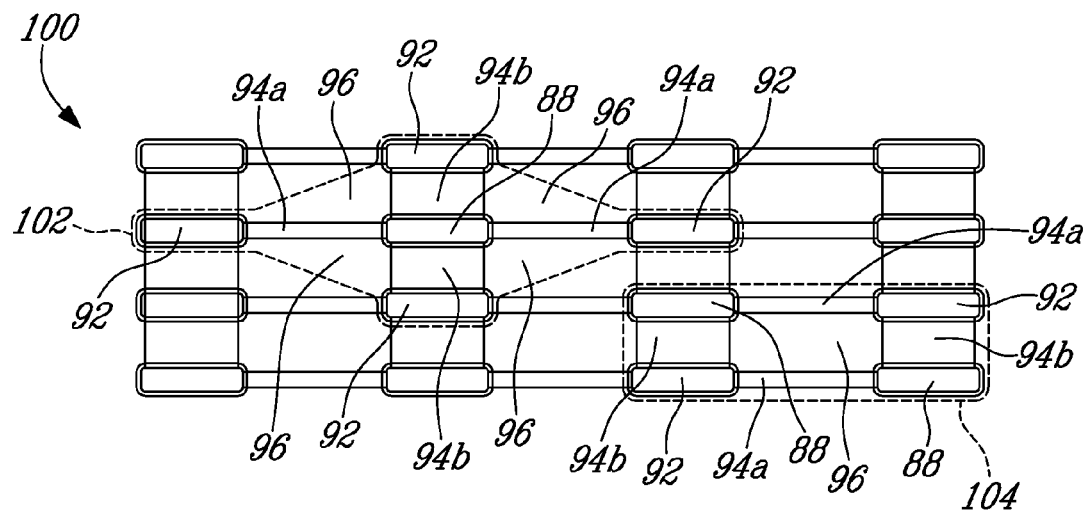
FIG. 6 shows a repeating two-dimensional contour pattern formed using the shapes depicted schematically in FIGS. 5A and 5B.

By way of example only, FIG. 6 illustrates how a three-dimensional contour profile formed in plates 70a and 70b may repeat according to a two-dimensional pattern such as a lattice pattern, i.e., according to a grid that repeats along two directions defined by corresponding basis vectors, which may or may not be orthogonal to one other. For example, lattice pattern 100 in FIG. 6 defines a rectangular or substantially rectangular grid in which protrusions 82 and recesses 84 repeat alternatively in two orthogonal directions, e.g., rows and columns. Thus, in any given row and in any given column, the lattice pattern 100 alternates between protrusions 82 and adjacent recesses 84. (For convenience, rather than protrusions 82 and recesses 84, domes 88 and feet 92 are indicated explicitly in FIG. 6, along with planar side surfaces 94a and 94b and hyperbolic surfaces 96.)

In such embodiments, each dome 88 may be neighbored by each of two adjacent feet 92 located in the same row as the dome 88 and two adjacent feet 92 located in the same column. Likewise each foot 92 may be neighbored by two pairs of adjacent domes 88, one pair from each row and column in which the foot 92 is located. Each dome 88 is also neighbored by four diagonally offset and adjacent feet 92, as is each foot 92 also neighbored by four diagonally offset and adjacent domes 88. As mentioned, planar side surfaces 94a and 94b and hyperbolic surfaces are bounded between adjacent dome(s) 88 and/or foot(s) 92.

The lattice pattern 100 shown in FIG. 6 also illustrates how plates 70a and 70b may be formed out of a planar sheet of metal or other thermal conductor without substantial material stretching. Trace 102 is a planar outline corresponding to the three-dimensional shape depicted in FIG. 5A and encompasses a single dome 88 (including apex 90), a pair of planar side surfaces 94a, a pair of planar side surfaces 94b, and approximate halves of four hyperbolic surfaces 96. As mentioned, the side planar surfaces 94a and 94b are pitched at an angle relative to the foot 92 to thereby create some altitude in the protrusion 82. The hyperbolic surfaces 96 may also be bent into shape through shear forces without significantly affecting the rectangular trace outline of the hyperbolic surfaces 96 prior to deformation, i.e., without significant material stretching in any direction(s) and/or axes.

Also shown in FIG. 6, trace 104 is a planar outline corresponding to the three-dimensional shape depicted in FIG. 5B, and encompasses a single hyperbolic surface 96 (in this case both halves of the "full" hyperbolic paraboloid) surrounded by a diagonally adjacent pair of domes 88 and a diagonally adjacent pair of feet 92. Trace 104 also illustrates how, as an adjacent dome 88 and foot 92 are brought together by angling or pitching of the side planar side surface(s) 94a or 94b extending therebetween, the hyperbolic surface 96 may be bent into shape without substantial material stretching. Each of the traces 102 and 104 may be used as a basic repeating unit to create the two-dimensional lattice pattern 100.

Figure 7:
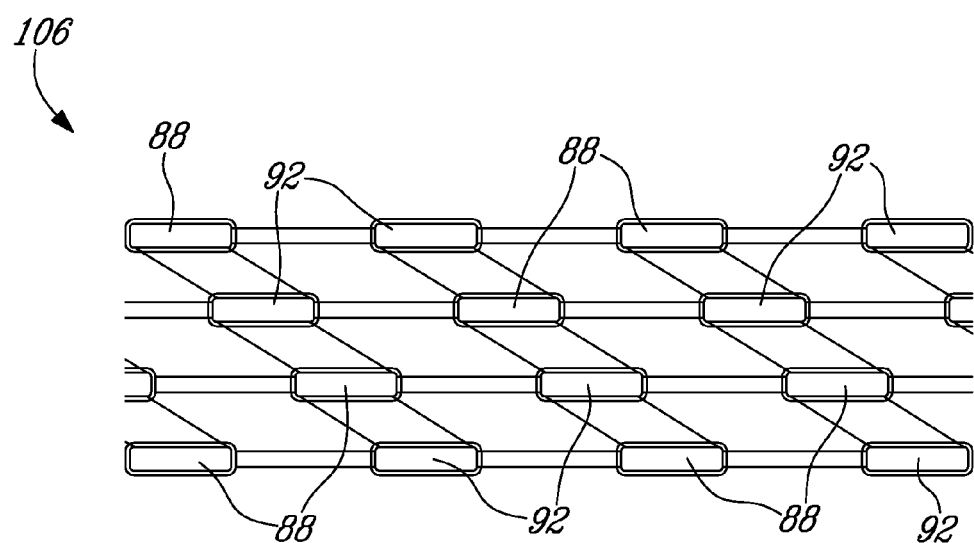
FIG. 7 shows an alternative two-dimensional contour pattern formed using the shapes depicted schematically in FIGS. 5A and 5B.

Referring now to FIG. 7, as an alternative to the lattice pattern 100 shown in FIG. 6, the plates 70a and 70b may also be formed according to a lattice pattern 106 that is provided with a skewed rectangular or diamond configuration, i.e., according to a grid that is defined by two non-orthogonal basis vectors. As can be seen, the lattice pattern 106 is similar to the lattice pattern 100, except that the "columns" of alternating protrusions 82 and recesses 84 are now oriented in a skewed fashion relative to (and therefore non-orthogonally) to the "rows" of alternating protrusions 82 and recesses 84. As used herein throughout, terms like "skewed" or "skewed lattice" may refer to lattice patterns, such as the lattice pattern 106 shown in FIG. 7, in which the pattern repeats according to a grid defined by two non-orthogonal basis vectors.

Relative to the lattice pattern 100, the lattice pattern 106 may decrease flow resistance through the plate assembly 70. Whereas the columns of alternating protrusions 82 and recesses 84 in the lattice pattern 100 are more or less in line with the direction of the fluid flow, in the lattice pattern 106, skewing of the columns relative to the direction of fluid flow provides a less undulating path in the general direction of fluid flow. Consequently fewer turbulence generating obstacles are located in the path of the fluid flow. In this way, the amount or degree of the skew may be related to the effective flow resistance of the plate assembly 70. Also, in some embodiments, dome(s) 88 and/or foot (feet) 92 may be skewed in the general direction(s) of the lattice pattern 106.

Figure 8A:
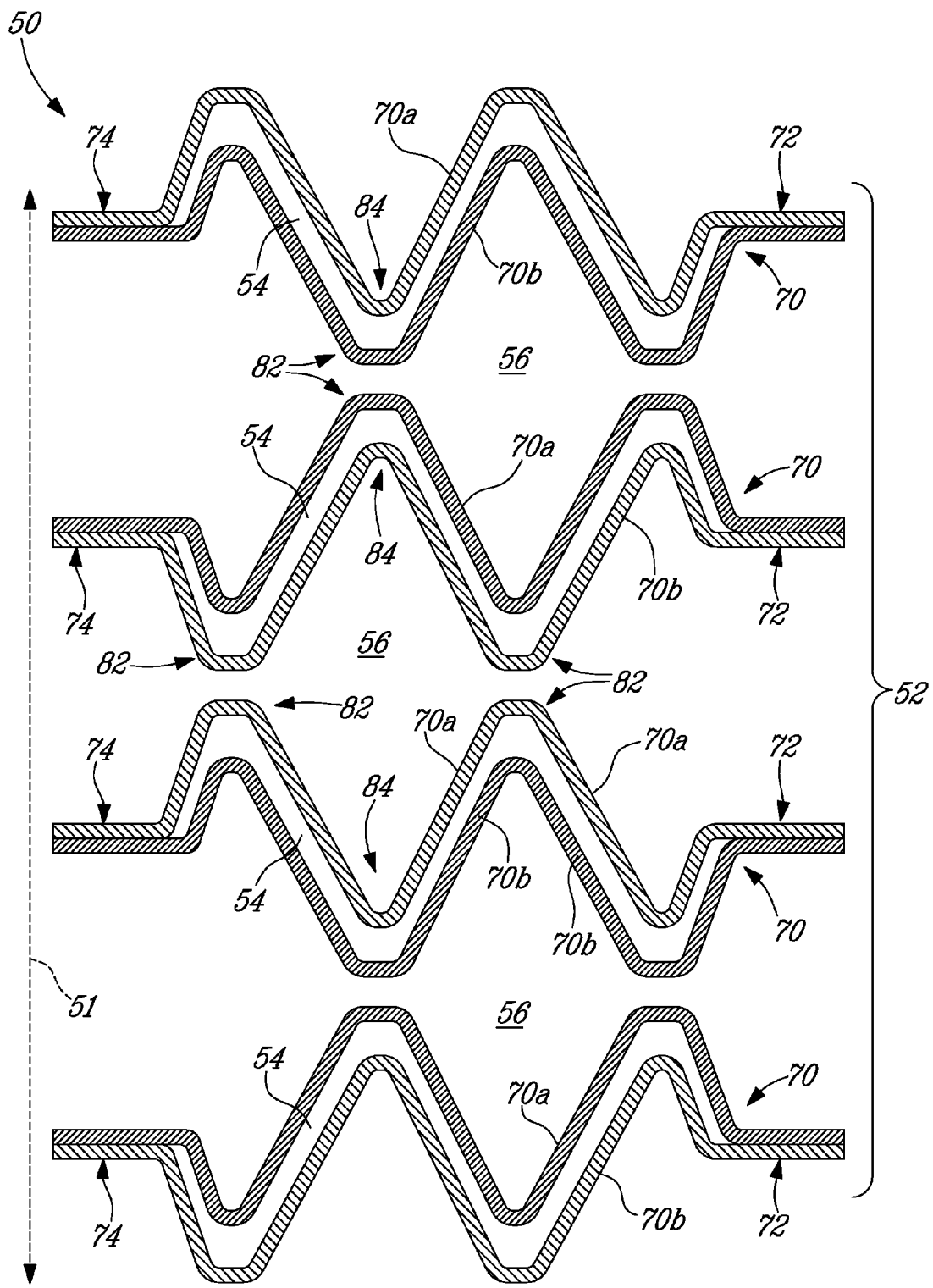
FIGS. 8A and 8B show, in quiescent and deformed states, partial cross-sectional profiles of a stack of the plate assemblies of FIG. 3.
Figure 8B:
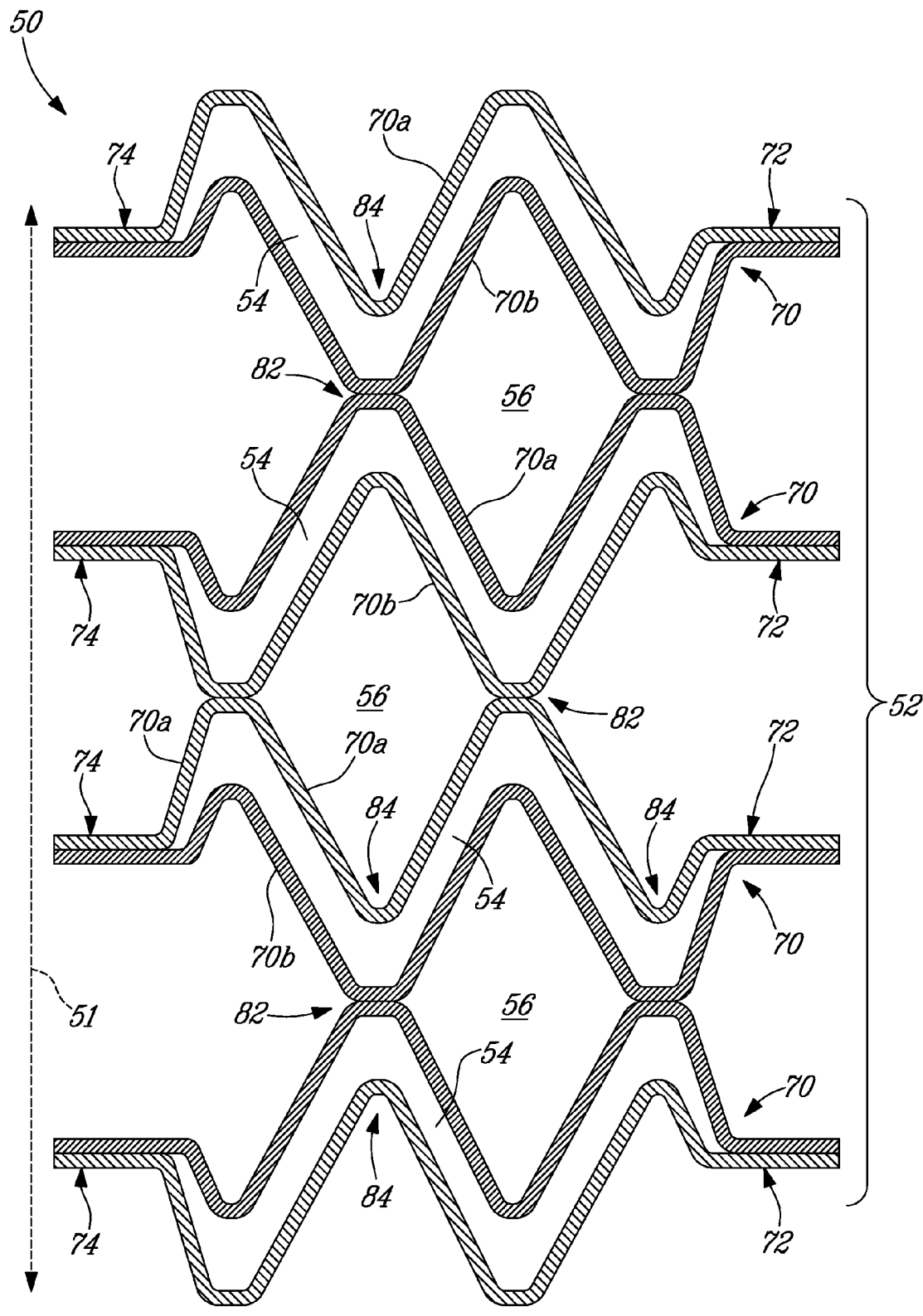

Referring now to FIGS. 8A and 8B, contour profile(s) of protrusions 82 and recesses 84 formed into the plates 70a and 70b, together with the relative positioning and orientation of adjacent plate assemblies 70 within a stack 52, can provide a heat recuperator 50 with a self-stiffening or self-reinforcing characteristic. Plate assemblies 70 may be supported in the stack 52 so that adjacent plate assemblies 70 are mirrored across the interstices 56. (By "mirrored", it may be meant that one plate assembly 70 is a reflection of an adjacent plate assembly 70 through an imaginary plane defined between the two adjacent plate assemblies 70). One or more contact points or regions on a given channel wall (e.g., 83 in FIGS. 4A and 4B) of each plate assembly 70 may be thereby aligned, across the intervening interstice 56 defined between adjacent plate assemblies 70, with corresponding contact points or regions formed in the opposing channel wall (e.g., 83) of the adjacent plate assembly 70.

For example, in embodiments where the plates 70a and 70b are formed with the three-dimensional contour profile shown in FIGS. 4A and 4B, one or more of the protrusions 82 on a given plate 70a or 70b may aligned opposite and generally facing a corresponding protrusion 82 from the adjacent plate assembly 70. In a similar way, one or more recesses 84 may be aligned opposite a corresponding recess 84. As explained further below, the flat apex 90 of each protrusion 82 may be aligned opposite to the flat apex 90 from the adjacent protrusion 82.

Resilient qualities of metals, composites, and/or other material(s) used to form plates 70a and 70b may tend to bias plate assemblies 70 toward "quiescent" or "rest" states (shown in FIG. 8A), in which each of a pair of adjacent plate assemblies 70 is spaced apart from the other across an intervening interstice 56 and not abutting or otherwise making contact at any points along the surface of the plates 70a and 70b. This is illustrated in FIG. 8A, for example, by the fact that mirrored protrusions 82 from adjacent plate assemblies 82 are positioned in close proximity, but are not in direct contact. As used herein throughout, the terms "quiescent" or "rest" may be used to refer to a state toward which the plate assemblies 70 are biased and will exist in the absence of external pressure or other force being exerted on the plate assemblies 70.

When fluids are conducted through one or both of fluid channels 54 and interstices 56, adjacent plates 70a and 70b in a given plate assembly 70 may tend to experience deflective or other deformative forces due to pressure differential between the two environments in which the fluids are conducted. For example, when a relatively high-pressure fluid is conducted through the fluid channels 54 as compared to interstices 56, plates 70a and 70b may tend to deflect or deform away from each other (shown in FIG. 8B) in response to an outwardly directed force experienced by the plates 70a and 70b caused by the pressure differential, so as to expand the depth of the fluid channel 54 defined between the plates 70a and 70b. Expansion of the fluid channels 54 caused by exertion of sufficient outward pressure on plates 70a and 70b can bring opposing contact regions from adjacent plate assemblies 70 into press-fit engagement (more generally into contact), in which state the plates 70a and 70b may exert counterbalanced forces so as to mutually resist further deflection or deformation.

In the case of the three-dimensional contour profile shown in FIGS. 4A and 4B, apexes 90 of opposing protrusions 82 in adjacent plate assemblies 70 are brought together into press-fit engagement under the deformative force of pressure differential. However, it is also possible for apexes 90 of a given plate 70a or 70b to be brought under the deformative force of pressure differential into contact with any other portion or contact region of the channel wall of an opposing plate assembly 70, consistent with the purposes explained through this disclosure.

In some embodiments, each plate 70a or 70b of a given plate assembly 70 may be brought into press-fit engagement with an opposing plate 70a or 70b of the adjacent plate assembly 70. However, in some embodiments, one or more plates 70a or 70b may, even when deflected or deformed by pressure differential, remain substantially in a non-contacted state by adjacent plate assembly(ies) 70. For example, end plate assemblies in the stack 52 may not be provided with an adjacent plate assembly 70 against which to press when deformed and therefore may not make contact with an opposing channel wall at any contact points or regions.

Although deflection of plates 70a and 70b may occur predominantly or primarily in a direction normal to the surfaces of the apexes 90 (i.e., parallel to the axis 51 of the stack 52, plates 70 may also experience some deflective forces in a direction tangential to the surfaces of the apexes 90, for example, due to thermal or other convections and currents that may develop within a heat recuperator 50. By forming apexes 90 to be substantially planar surfaces, which are generally parallel to one another and orthogonal to the direction of the axis 51, when contacted together, the opposing apexes 90 are able to resist further outward deflection of the plates 70a and 70b in the general direction of the axis 51, while also permitting lateral sliding of adjacent plate assemblies 70 to thereby dampen the effects of convection within the heat recuperator 50.

The above description is meant to be exemplary only, and one skilled in the art will recognize that changes or variations may be made without departing from the scope of the embodiments disclosed herein. For example, while certain three-dimensional contour profiles for the plate assemblies have been described herein that may be promote cooperation between adjacent plate assemblies during operation, other three-dimensional contour profiles may also suitably provide the plate assemblies with one or more contact points or regions so as to make adjacent plate assemblies suitable for press-fit engagement during operation. Certain three-dimensional contour profiles having minimal material stretching were also described herein, although others not specifically described may be possible as well. The plate assemblies described herein may also be formed out of possibility different thermally conductive materials and according to different mechanical processes. Still other modifications which fall within the scope of the described embodiments may be apparent to those skilled in the art, in light of a review of this disclosure, and such modifications are intended to fall within the appended claims.

What is claimed is:

1. A heat recuperator comprising:
a plurality of channel walls composed substantially of thermally-conductive material and supported in spaced-apart relation to alternately define fluid channels and interstices therebetween, the fluid channels configured to receive at least one primary fluid flow and the interstices configured to receive at least one secondary fluid flow and effect heat exchange therebetween;
wherein the plurality of channel walls deform, by pressure differential between the primary and secondary fluid flows, between a quiescent state where mutually opposed contact regions formed in adjacent pairs of the channel walls are not in contact and a deformed state where the plurality of channel walls are stabilized through press fit engagement of the mutually opposed contact regions formed in the adjacent pairs of the channel walls.

2. The heat recuperator of claim 1, wherein each of the channel walls is configured to be biased toward the quiescent state.

3. The heat recuperator of claim 1, wherein the channel walls of one or more fluid channels are spaced apart by opposing sidewalls.

4. The heat recuperator of claim 1, wherein the channel walls of one or more fluid channels are non-abutting.

5. The heat recuperator of claim 1, wherein the plurality of fluid channels are supported in a stack of fluid channels.

6. The heat recuperator of 5, wherein the plurality of fluid channels comprises a fluid intake manifold and a fluid exhaust manifold for conducting the at least one primary fluid flow through the plurality of fluid channels.

7. The heat recuperator of claim 6, wherein the fluid intake and exhaust manifolds are located on a common side facet of the stack of fluid channels.

8. The heat recuperator of claim 6, wherein each fluid channel comprises an inflow portion adjacent to the fluid intake manifold, an outflow portion adjacent to the fluid exhaust manifold, and a bend portion extending between the inflow and outflow portions.

9. The heat recuperator of claim 1, wherein the plurality of fluid channels is sealed off from the plurality of interstices.

10. The heat recuperator of claim 1, wherein at least one pair of the mutually opposed contact regions have generally planar and parallel aspect profiles to permit lateral sliding of the adjacent pair of the channel walls without disengagement therebetween.

11. The heat recuperator of claim 1, wherein at least one of the opposing channel walls is contoured according to a three-dimensional contour profile of alternating protrusions and recesses.

12. The heat recuperator of claim 11, wherein each of the protrusions comprises:
a central dome portion;
a plurality of planar side surfaces arranged peripherally around and extending distally from the central dome portion; and
a plurality of hyperbolic side surfaces, each hyperbolic side surface bounded by the dome portion and a corresponding adjacent pair of the planar side surfaces.

13. The heat recuperator of claim 11, wherein the protrusions on a given one of the channel walls are aligned with and accommodate the recesses from the other of the channel walls to define a corresponding one of the fluid channels therebetween.

14. The heat recuperator of claim 11, wherein the contour profile accommodates nesting of the channel walls without provision of interior support structures.

15. The heat recuperator of claim 11, wherein the contour profile repeats according to a lattice pattern defined by two non-orthogonal vectors.

16. The heat recuperator of claim 12, wherein the hyperbolic side surfaces from two diagonally adjacent protrusions and two diagonally adjacent recesses form a hyperbolic paraboloid.

17. The heat recuperator of claim 12, wherein each of the plurality of planar side surfaces comprises a stripline section.

18. The heat recuperator of claim 12, wherein the central dome portion comprises a flat apex portion, the flat apex portion of the protrusions providing the at least one contact region of the channel walls.

19. A gas turbine engine comprising:
a compressor configured to pressurize an air flow;
a combustor configured to ignite a mixture of fuel and the pressurized air flow so as to develop a flow of expanded combustion gases through one or more turbine sections for generating propulsion; and
a heat recuperator interposed in fluid communication between the compressor and the combustor, the heat recuperator comprising a plurality of channel walls composed substantially of thermally-conductive material and supported in spaced-apart relation to alternately define fluid channels and interstices therebetween, the fluid channels configured to transport the flow of the pressurized air from the compressor to the combustor heated during transport by a flow of exhaust gases conducted through the interstices;
wherein the plurality of channel walls deform, by pressure differential between the pressurized air flow and the exhaust gases, between a quiescent state where mutually opposed contact regions formed in adjacent pairs of the channel walls are not in contact and a deformed state where the plurality of channel walls are stabilized through press fit engagement of the mutually opposed contact regions formed in adjacent pairs of the channel walls; and
at least one of the opposing channel walls includes a protrusion comprising: a central dome portion; a plurality of planar side surfaces arranged peripherally around and extending distally from the central dome portion; and a plurality of hyperbolic side surfaces, each hyperbolic side surface bounded by the dome portion and a corresponding adjacent pair of the planar side surfaces.

20. A heat recuperator comprising:
a plurality of channel walls composed substantially of thermally-conductive material and supported in spaced-apart relation to alternately define fluid channels and interstices therebetween, the fluid channels configured to receive at least one primary fluid flow and the interstices configured to receive at least one secondary fluid flow and effect heat exchange therebetween;
wherein at least some of the plurality of channel walls are contoured by a plurality of hyperbolic surfaces extending between adjacent protrusions and recesses formed in the channel walls; and
wherein the plurality of channel walls deform, by pressure differential between the primary and secondary fluid flows, between a quiescent state where mutually opposed contact regions formed in adjacent pairs of the channel walls are not in contact and a deformed state where the mutually opposed contact regions are in contact.

* * * * *